United States Patent
Norwich

[11] 3,728,522
[45] Apr. 17, 1973

[54] POINT-OF-SALE CREDIT TRANSACTION SYSTEM

[75] Inventor: Daniel Norwich, Beverly Hills, Calif.

[73] Assignee: Telecredit, Inc., Los Angeles, Calif.

[22] Filed: Dec. 17, 1971

[21] Appl. No.: 209,264

[52] U.S. Cl. .................. 235/61.7 B, 340/149 A
[51] Int. Cl. ..................... G05b 1/00, G06r 5/00
[58] Field of Search ................. 235/61.7, 61.7 B, 235/61.12, 61.12 M, 61.11 D; 340/149, 149 A; 346/74 M

[56] References Cited

UNITED STATES PATENTS

| | | | |
|---|---|---|---|
| 3,564,210 | 2/1971 | Presti | 235/61.7 B |
| 3,610,889 | 10/1971 | Goldman | 235/61.7 B |
| 3,665,513 | 5/1972 | Benson et al. | 235/61.12 M |

Primary Examiner—Thomas A. Robinson
Attorney—B. G. Nilsson et al.

[57] ABSTRACT

A credit transaction system is disclosed for use with cards (carrying machine-readable identification of the user) and sales records (bearing a recording medium). The system receives a card along with a blank sales record for processing an anticipated sale or other transaction. The value of the transaction, and identification of the subject thereof, the date, the location of the system, and so on are supplied to the system for the development of representative electrical signals. The signals representative of the transaction are processed to arrive at an approval or disapproval of the transaction and in that regard the card is updated. Additionally, if the transaction is approved, the system records data pertinent to the transaction on the sales record. As a consequence, point-of-sale information is captured in the form of source data and converted to a machine-readable form on the transaction record.

3 Claims, 4 Drawing Figures

PATENTED APR 17 1973

000
POINT-OF-SALE CREDIT TRANSACTION SYSTEM

BACKGROUND AND SUMMARY OF THE INVENTION

The use of credit cards, and the like, either in the form of small, plastic cards, plates, tokens, or other devices has become widespread to identify a person approved for credit transactions. Customarily, the person assigned such a card (assignee) is approved for credit transactions (within limits) simply by presenting his card. Although various forms of the system have been very effective, significant losses frequently occur. Specifically, the card may be possessed by a person other than its assignee or the assignee of a card may change to the degree that he is no longer a good credit risk.

To combat losses incurred in conjunction with the use of credit cards, various devices and systems have been proposed. For example, as disclosed in U.S. Pat. No. 3,610,889, issued Oct. 5, 1971, to R. N. Goldman, one form of system maintains a record on the card itself that is indicative of the status of its assignee. In an illustrative system, each time the card is presented to support a credit transaction, the amount of such transaction is recorded, with the result that the card invariably indicates the aggregate values of transactions supported by it during a predetermined month. Credit limits supported by a card thus may be established and maintained.

Another problem attendant the use of credit cards is the requisite volume of paperwork. For example, at the location of a credit transaction, upon approval of the transaction, a clerical or other person conventionally records the transaction on a sales record. It is noteworthy that this operation is often performed under adverse circumstances in which the person is somewhat excited with the result that substantial errors occur.

Sales records of individual credit transactions are then collected and usually are processed in bulk to some extent. However, if computers are employed, it is necessary to transfer the pertinent information on each sales record into the computing facility. This operation almost invariable is expensive and time consuming in relation to the operation of a computing facility. Accordingly, a considerable need exists for an improved system involving the processing of credit transactions.

In general, the present invention comprises a credit-approval unit functioning in cooperation with elements for recording pertinent data in machine-readable form on a sales record. Specifically, the recorded information may include an identification of the card assignee, identification of the transactions involved, identification of the location of the transaction, a specification of the value or dollar amount involved and so on. As the record is accomplished with relatively little manual effort, and is provided, for example, on a magnetic stripe, it may be processed by a computing facility with a substantial reduction in time and cost, as well as improved accuracy.

BRIEF DESCRIPTION OF THE DRAWINGS

In the drawings, which constitute a part of this specification, an exemplary embodiment demonstrating various objectives and features hereof is set forth, as follows.

DETAILED DESCRIPTION OF THE ILLUSTRATIVE EMBODIMENT

As required, a detailed illustrative embodiment of the invention is disclosed herein. The embodiment merely exemplifies the invention which may, of course, be constructed in accordance with various other forms, some of which may be somewhat different from the disclosed illustrative embodiment. However, specific structural and functional details disclosed herein are merely representative and in that regard, provide a basis for the claims herein which define the scope of the invention.

Figure 1:
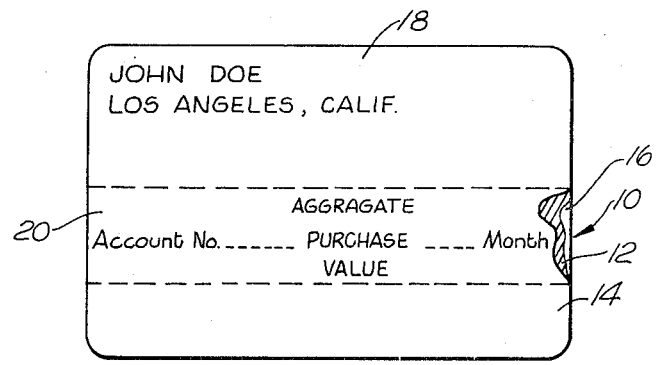
FIG. 1 is a plan view of an identification or credit card suitable for use in cooperation with the system of the present invention.

Referring initially to FIG. 1, an illustrative card 10 in accordance herewith is represented. The card 10 comprises an embossed, laminated plastic material having a strip 12 of magnetic recording medium, e.g., fine iron oxide particles, sandwiched between plastic laminations. Specifically, an upper lamination 14 is bonded to a lower lamination 16 with the plastic strip 12 therebetween. The section of the card generally indicated at 18 is embossed to identify the assignee as by name and so on.

Coinciding to the area of the magnetic strip 12 (indicated by dashed lines) is the recording section 20. In the instance of a magnetic strip 12, the recorded information (as operated) is not humanly perceivable. However, for purposes of illustration and to simplify the explanation, the recorded information is indicated in FIG. 1. The recording section 20 of the strip 12 is employed to record binary digits indicative of the assignee of the card (Account No.), the status of his account (aggregate purchase value) and a current period (month).

Figure 2:
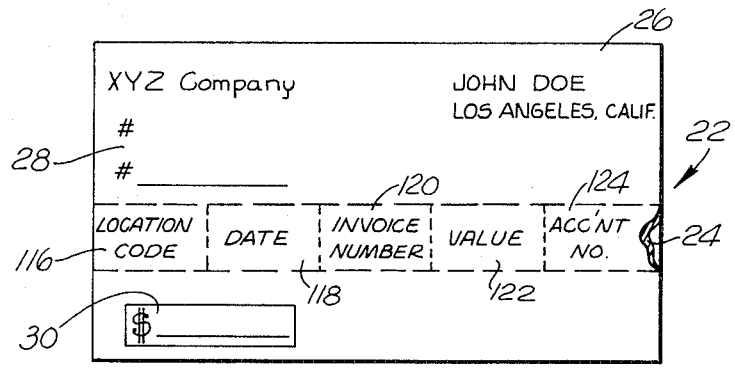
FIG. 2 is a plan view of a sales record suitable for use in cooperation with the system of the present invention.

The card 10 as described above is employed in a system hereof along with a sales record 22 as depicted in FIG. 2. Generally, the sales record 22 may comprise simply a single sheet of stiff paper or cardboard or alternatively may comprise any of a variety of composite records as for providing multiple copies. The record 22 as illustratively presented herein includes a sandwiched magnetic strip 24 for recording data in accordance herewith. Additionally, the record 22 may also receive an indication of the person using the card in an area 26 and inventory numbers of purchased products as well as a dollar total may be indicated in the areas 28 and 30 if desired.

In general, in accordance herewith, the card 10 (FIG. 3) along with the sales record 22 are received in a unit 32 in accordance herewith to: (1) determine the status of the account represented by the card; (2) update the card 10; and (3) record identifying data from the card 10, along with current data supplied to the unit 32, on the sales record 22.

Figure 3:
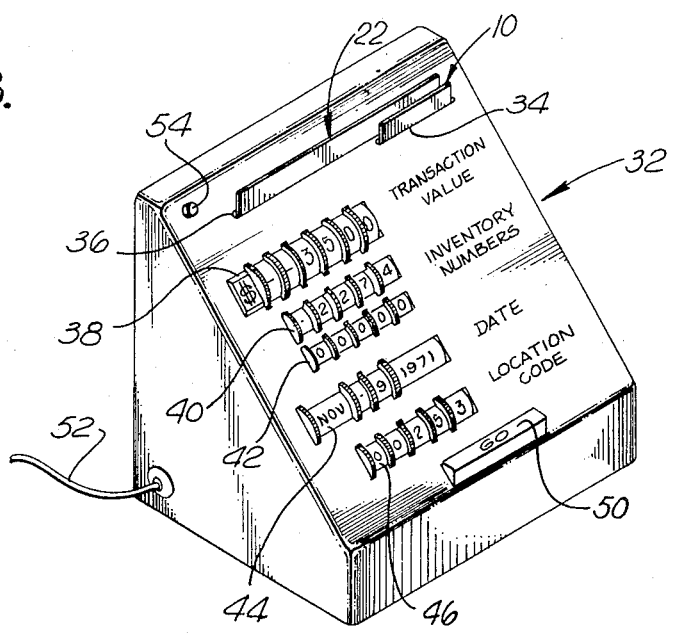
FIG. 3 is a perspective view of a unit embodying the system of the present invention.

Considering an illustrative use of the unit of FIG. 3, assume, for example, that the unit is located at a retail sales station for consummating purchase transactions. Assume further that a sales transaction is being considered, specifically involving an item identified by inventory No. 2274 with a selling price of 35 dollars. Accordingly, the card 10 presented by the purchaser is placed in the unit 32 through a slot 34, along with a sales record 22 which is placed in a slot 36. Next, the value of the transaction, e.g., 35 dollars, is set on the thumb-wheel rotary register 38 while the inventory No. 2274 is placed on the similar register 40. Of course, any practical number of inventory registers may be incorporated in the unit 32 and exemplary of this consideration, an additional register 42 is illustrated.

The date of the transaction under consideration is set on the thumb-wheel register 44 while the location designation is set on the register 46. Of course, various indications may be provided on the location register 46, for example, one digit may indicate specific sales persons while another digit indicates the location of the unit 32.

Generally, with regard to each of the registers as considered above, it is to be appreciated that a wide variety of different structures may be employed. However, in the illustrative system, the thumb-wheel registers utilized are as disclosed in the above-referenced U.S. Pat. No. 3,610,889. Accordingly, each register provides a set of binary signals indicative of the state thereof.

With the registers set to reflect the contemplated transaction, the operator next depresses a "GO" button 50 to command the operation of the unit 32. It is to be noted, that the unit 32 is energized as through an electrical cable 52 and accordingly, proceeds to perform an interrelated series of operations. First, the system verifies the acceptability of the card 10 to support a credit transaction. If the card is not acceptable, a light 54 is illuminated to signal "rejection." In such an instance, the operator may take various actions depending upon policy considerations. For example, the entire transaction simply may be aborted or, alternatively, further investigation may be performed to determine the status of the card holder's account.

In the event that the card 10 is approved, to support the contemplate transaction, the card is updated to reflect the contemplated transaction. Additionally, a record of the transaction is recorded on the sales record 22. Of course, various recording techniques may be employed for various purposes. Generally, the important consideration resides in recording the transaction value along with supporting data, e.g., the date, inventory numbers and so on, in the magnetic strip 24 (FIG. 2) of the sales record 22.

Upon completion of the operation by the unit 32, the operator withdraws the card 10 for return to its assignee and the sales record 22 for bulk processing at a computing facility. As indicated, a copy of the sales record 22 may be made for the card holder if desired. However, the important consideration resides in the fact that the sales record may be combined with others in groups and machine processed without substantial manual effort. Generally, the information recorded upon the record 22 is likely to be accurate and accurately processed to the point of invoicing card assignees and appropriately maintaining their accounts. As a consequence, the system affords a considerable advantage over conventional systems.

Considering the detailed structure of the unit 32, reference will now be made to FIG. 4 wherein previously described physical registers are identified by blocks bearing identical reference numerals. Essentially, the blocks 38, 40, 44 and 46 comprise sets of binary switches associated with thumb wheels to provide binary signals indicative of the information represented by the thumb wheels. The switches 38, 40, 44 and 46 are connected, respectively, through multiplexers 60, 62, 64 and 66 to a sequencer 68.

Functionally, the multiplexers 60, 62, 64 and 66 serve to convert the parallel presentation of signals afforded by the registers 38, 40, 44 and 46 respectively, to a serial form. Of course, multiplexers are well known in the prior art and a wide variety of structures may be employed herein. The multiplexers 60, 62, 64 and 66 are also individually connected to a timing unit 70 to receive signals $T_i$ through $T_n$ for clocking the binary signals in their passage from the registers to the sequencer 68.

The sequencer 68, although represented in an electro-mechanical form, will normally take the form of an electronic equivalent, as well known in the prior art. Specifically, the sequencer includes a home segment 72 and commutating segments 74, 75, 76, 77 and 78. The rotating switch 80 dwells on a "home" segment during the quiescent state of the system; however, during an operating cycle, the switching element 80 moves to sequentially contact each of the other segments.

The segments 75, 76, 77 and 78 are connected, respectively, to the multiplexers 66, 64, 62 and 60. The remaining segment 74 is connected through a multiplexer 82 to receive signals from an identification register 84 which is connected through a cable 86 to a card reader 88. The switching element 80 of the sequencer 68 is electrically connected to a sales-record recorder 90 and is mechanically connected (as indicated by dashed line 92) to a stepper 94 which is connected to receive the pulses $T_i$ from the timing unit 70.

Essentially, the timing unit 70, on being actuated by a pulse (received through a conductor 96) provides the series of discrete pulses $T_i - T_n$ in recurrent sets coinciding to the dwell periods of the element 80 on the segments of the sequencer 68. A wide variety of timing and clocking structures are well known in the prior art which may be employed as the unit 70 to operate the stepper 94. Again, as indicated above, in an operating embodiment hereof, these units may well take the form of electronic equivalents to the represented electro-mechanical structure which is employed for illustrative purposes herein.

The identification register 84, which is connected through the multiplexer 82 to the segment 74, receives signals representative of the customer's account number from the card reader 88. That is, pursuing the exemplary embodiment as considered above, the card reader 88 senses the area 20 (FIG. 1) of the card 10 to provide electrical signals representative of: (1) the account number, (2) the aggregate purchase value represented and (3) the month of last use. Essentially, the last two items of information relate to the status of the account represented by the card 10 as more fully described in the above-referenced U.S. Pat. No. 3,610,889. A disclosure is also provided in that patent of a card reader structure as may be employed for the card reader 88.

The signal-represented account number from the card reader 88 (FIG. 4) is supplied, as indicated above, through the cable 86 to the identification register 84. The remaining signal-represented information sensed from the card (value and month) is supplied through a cable 100 to a date and value status unit 102. Signals representative of the current date, as contained in the register 44, is also applied to the unit 102 through a cable 104. Similarly, signals representative of the current-transaction value are supplied from the register 38, as indicated, to the unit 102.

Functionally, the unit 102 adds the value represented by the signals from the register 38 to the accumulated value recorded on the card (received in signal-represented form from the card reader 88). That total is then verified against the approved limits for the card assignee and the date is verified to determine whether or not the charges are for the current period, e.g., month. If the card assignee has exceeded his allowable charges for the current month, a signal is supplied through a conductor 110 to energize a rejection signal 112 which comprises the lamp 54 (FIG. 3). Alternatively, if the customer or assignee of the card has not exceeded his limit for the instant month, a signal appears in the conductor 96 (FIG. 4) to initiate the operation of the timing unit 70. Also as a part of the operation of the unit 102, a card recorder 114 is controlled to record the current status of the card holder's account on the card 10 as described in detail in the referenced U.S. patent.

In the present system, the unit 102 is designated as a status-determining element. That element may take a variety of specific forms; however, in the illustrative embodiment, it comprises a sub-system substantially as described in the above-referenced U.S. Pat. No. 3,610,889.

Figure 4:
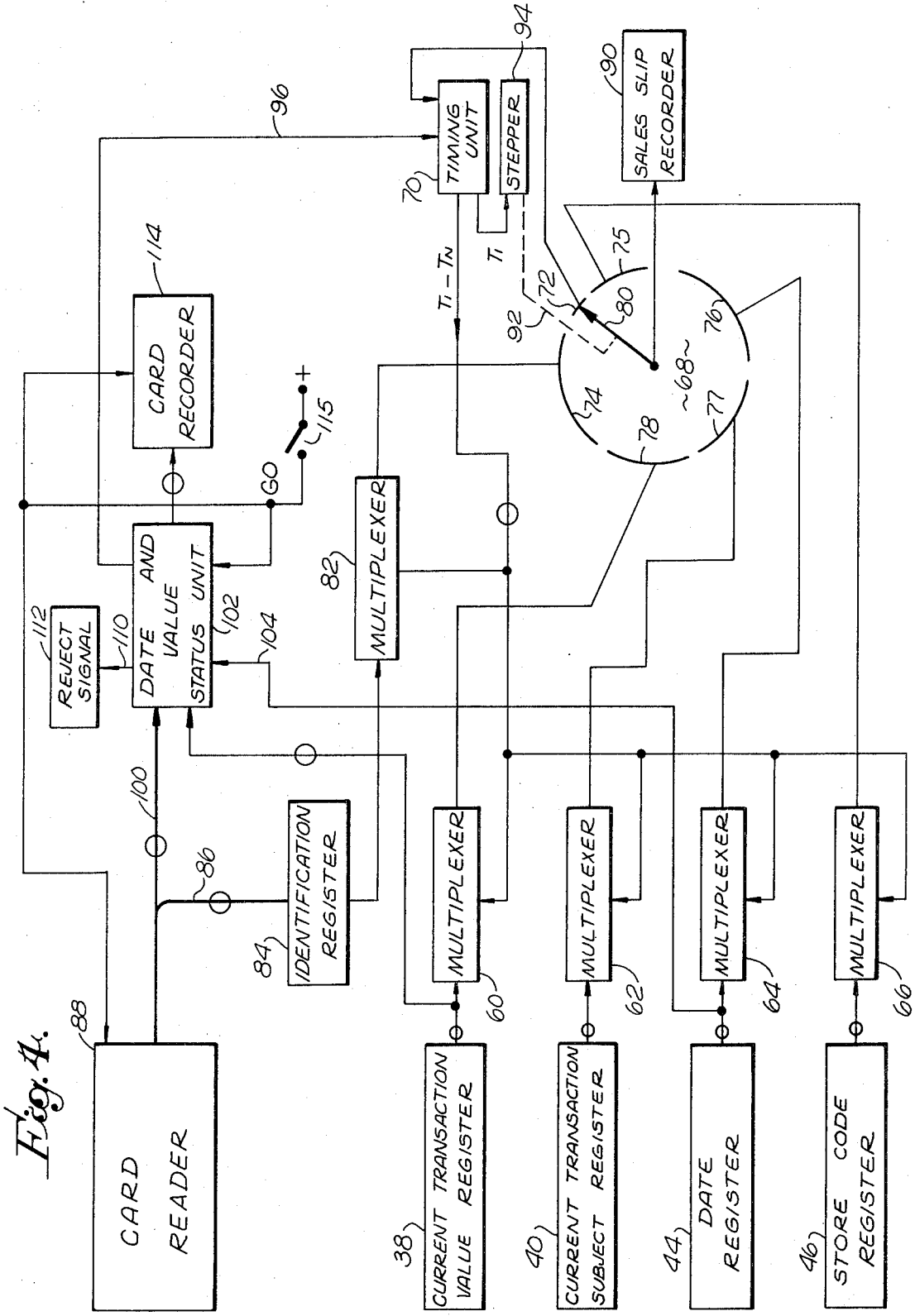
FIG. 4 is a diagrammatic representation of the detailed electrical system embodied in the unit of FIG. 3.

In view of the above preliminary physical description of the system FIG. 4, a complete understanding thereof may now be best accomplished by assuming a cycle of operation in conjunction with the structures represented by each of the figures. Accordingly, assume further to the above example, that a card assignee presents the card 10 to an operator, e.g., a retail clerk, to support a specific credit transaction involving an item identified by inventory No. 2274 at a total price of 35 dollars. Further, that the date of the transaction is: Nov. 9, 1971, and that the unit 32 is positioned at station number: "five" and the operator is designated as number "three".

First, the operator inserts a fresh sales record 22 (FIG. 2) into the slot 36 (FIG. 3) then aligns the credit card 10 (FIG. 1) in the slot 34 (FIG. 3) with the sales record 22. Next, the operator sets the thumb wheel register 38 to indicate the transaction value of 35 dollars. The inventory No. 2274 is set in the thumb wheel register 40 while the date is set in the register 44 and the location code "five three" (indicating station "five" and clerk "three") is set in the register 46. Having completed these operations, the operator next simply depresses the "GO" button 50 (FIG. 3).

The depression of the "GO" button 50 actuates a switch 115 (FIG. 4) to activate the date and value status unit 102 along with the card reader 88 and the card recorder 114. As a consequence, the data from the card is sensed to provide electrical signals representative of: the customer's account number, aggregate purchases and the month of such purchases. If the period is current, the total value of purchases is added with the current transaction value received by the unit 102 through the cable 106. One possibility is that the new total value will exceed the customer's credit limit. In such an event, the "reject" signal 112 is energized resulting in the illumination of the lamp 54 (FIG. 3) to indicate a rejection to the sales person. In that event, as indicated above, the sales person may take further investigatory action or pursue other action in accordance with a managerial policy regarding rejections.

Assuming that the customer (card assignee) is within his established credit limits, the unit 102 (FIG. 4) provides a signal in the conductor 96 indicating that the anticipated transaction is approved. As a consequence, the timing unit provides an initial sequence of timing signals $T_i - T_n$. The initial signal $T_i$ actuates the stepper 94 to move the switch 80 from the home position 72 onto the segment 75. During the following dwell interval, the multiplexer 66 receives the timing signals $T_i - T_n$ while the contents of the register 46, e.g., signals representative of "five three" are supplied in serial form through the segment 75 and the switch contact 80 to the sales slip recorder 90 and recorded on the sales record 22 in binary form in the area 116 (FIG. 2). At the conclusion of the initial series of timing pulses $T_i - T_n$, a short interval may be provided after which the next signal $T_i$ is provided to actuate the stepper 94 (FIG. 4) for moving the switch 80 to dwell on the segment 76. During that dwell interval, the contents of the date register 44 is reduced to a series of binary signals which are passed from the multiplexer 64 through the segment 76 and the switch 80 to be recorded by the sales slip recorder in the space 118 (FIG. 2) of the sales record 22.

During the next portion of the operation, the following pulse $T_i$ actuates the stepper 94 to drive the contact 80 onto the segment 76. Just as previously described, the contents of the current transaction register is then recorded from electrical signals supplied through the sequencer 68 in the space 120 on the sales record. Similarly, during the following interval (initiated by the timing pulse $T_i$) with the contact switch 80 dwelling on the segment 78, the signals representative of the current value are provided through the multiplexer 60 and sequencer 68 to be recorded by the sales slip recorder 90 in the space 122 (FIG. 2).

Finally, the contents of the identification register 84 (assignee's account number) as sensed from the card by the card reader 88 is transferred in serial fashion from the register 84 through the multiplexer 82 and segment 74 of the sequencer 68 to be received in the recorder 90 and recorded in the space 124 (FIG. 2). Consequently, the sales record 26 now carries a complete record of the transaction in machine-readable form. Of course, individual formats employed may vary widely; however, certain classifications of data will usually be recorded. Specifically, the dollar value, or other indications of value on the transaction as well as the account number generally afford the most basic of the recorded transaction record. With such basic data, machine processing may be employed at a computing facility to accomplish computer billing as well as accounts-receivable records.

As will be readily apparent to one skilled in the art, the selected data is only one of several aspects of the system which may be widely varied in accordance with particular objectives. Specifically, it may be desirable to variously implement the extent to which a sales person manually records information on the record 22. Also, it may be advantageous to variously implement further printed material on the sales record 22 in accordance with signal-represented available information. Of course, these considerations simply indicate that the basic concept of the present system is subject to a wide variety of implementations and the recognition of that consideration affords considerable support for the definition of the scope hereof in accordance with the claims set forth below.

What is claimed is:

1. A point-of-sale credit transaction system for use with credit cards or the like bearing recorded representations to identify an assignee and a status indication of the assignee's account, and also with sales records bearing a strip means for recording and providing electrical signals, comprising:

means for sensing one of said cards to provide electrical signals to identify the assignee and provide status indications of the assignee's account;

means for providing electrical signals representative of a current transaction value;

means for providing electrical signals representative of a location code for said system;

means for receiving said signals to indicate a status of the assignee's account and representative of a current transaction value, operative to provide an approval signal indicating approval of a current transaction;

means operative conditionally upon the existence of said approval signal to record altered status indications of the assignee's account on said one of said cards to reflect said current transaction value; and means for recording upon said strip means of one of said sales records, said signals representative of a current transaction; said signals to identify the assignee of said one card and said signals representative of a location code for said system.

2. A credit transaction system according to claim 1 wherein said credit cards, or the like, bear a variable recording medium to record value-time signals representative of an aggregate value amount of transactions supported by the card during a predetermined period, as said status indication of the assignee's account and wherein said system further includes: means for sensing said value-time signals for accumulation with said electrical signals representative of a current transaction value to provide current value-time signals, and means for recording said current value-time signals on said card or the like.

3. A credit transaction system according to claim 2 further including means settable for providing signals representative of a current date and further including means for testing said current date signals against said value-time signals.

* * * * *